O. E. MICHAUD.
ROLLER BEARING.
APPLICATION FILED MAR. 23, 1914.

1,165,433.

Patented Dec. 28, 1915.

Witnesses:
Edgar P. Farmer,
All Holcombe

Inventor:
O. E. Michaud,
by Carr & Carr
his attys.

UNITED STATES PATENT OFFICE.

ONESIME E. MICHAUD, OF ST. LOUIS, MISSOURI.

ROLLER-BEARING.

1,165,433.  Specification of Letters Patent.  Patented Dec. 28, 1915.

Application filed March 23, 1914. Serial No. 826,756.

*To all whom it may concern:*

Be it known that I, ONESIME E. MICHAUD, a citizen of the United States, and a resident of the city of St. Louis and State of Missouri, have invented a new and useful Improvement in Roller-Bearings, of which the following is a specification.

This invention relates to combined radial and thrust antifriction bearings similar to the bearings shown in my pending application Serial No. 791,684, wherein a series of bearing rollers are spaced circumferentially between inner and outer bearing rings. In the present invention the rollers are held in alinement at equal distances apart around the inner bearing ring by means of spacing rollers arranged between them.

The object of the invention is to provide improved means for maintaining the bearing rollers in alinement and for retaining the bearing rollers and spacing rollers in assembled position around the inner bearing ring independently of the outer bearing ring.

Other objects of the invention appear in the following description of the embodiment of the invention shown in the accompanying drawing.

The invention consists in the parts and arrangements of parts hereinafter described, and is more particularly defined in the appended claims.

Figure 1:
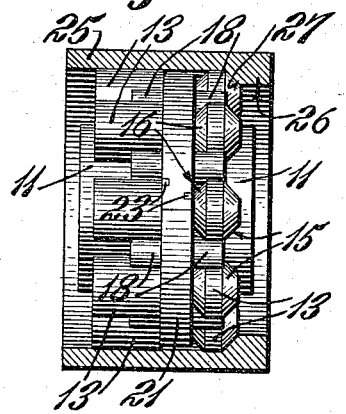
Figure 2:
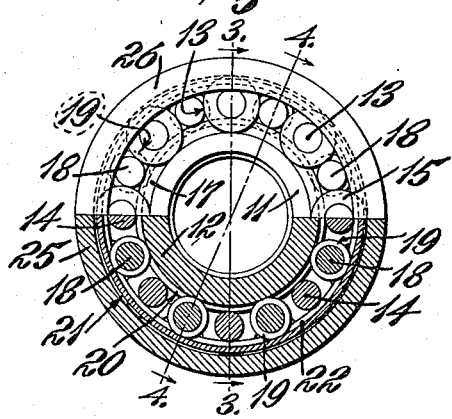
Figure 3:
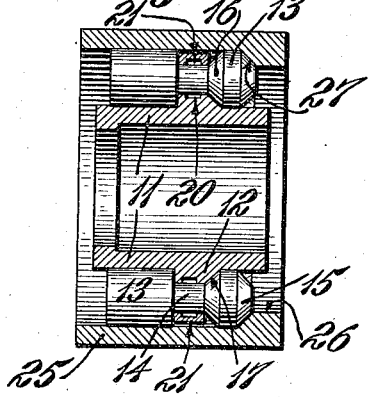
Figure 4:
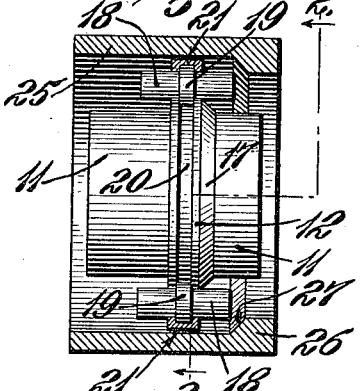
Figure 5:
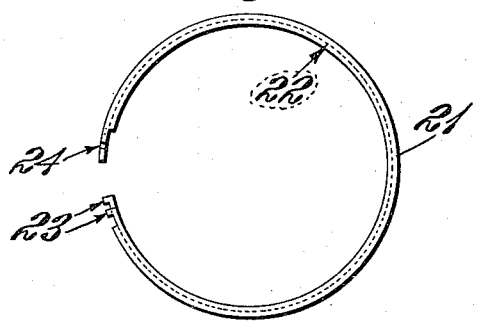
Figure 6:
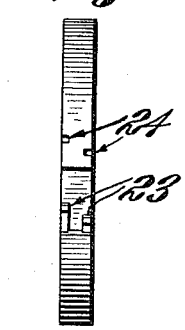

In the drawings, in which the same reference characters are used in the several views to designate the same or like parts, Figure 1 is a side view of the bearing, showing the outer bearing ring in section and the parts inclosed therein in elevation. Fig. 2 is a part end view and part cross-section of the bearing, the cross section being taken on the line 2—2 in Fig. 4, looking in the direction of the arrows; Fig. 3 is a longitudinal section of the bearing taken on the line 3—3 in Fig. 2, the bearing rollers being shown in side elevation; Fig. 4 is a longitudinal section of the bearing taken on the line 4—4 in Fig. 2, the spacing rollers being shown in side elevation; and Figs. 5 and 6 are side views of the spacing ring.

As shown in the drawings, the improved device consists of an inner bearing ring 11 having a flange 12 around its periphery intermediate its ends. The outer surface of the inner bearing ring on each side of the flange 12 is cylindrical, and forms two raceways for the cylindrical end portions of the bearing rollers 13. The bearing rollers 13 are grooved circumferentially between their end bearing portions, the grooves forming necks 14 which connect the end bearing portions of the bearing rollers. One end of each bearing roller is beveled to form a conical bearing surface 15, and the edge of the groove adjacent thereto is likewise beveled to form an oppositely disposed conical bearing surface 16. The flange 12 on the inner bearing ring is beveled on one edge to form a conical bearing surface 17 against which the conical bearing surfaces 16 of the grooved rollers bear.

Between each two grooved bearing rollers 13 is a cylindrical spacing roller 18 having a straight-sided flange 19 around its middle. The diameter of the cylindrical ends of the spacing rollers is the same as that of the cylindrical necks 14 of the bearing rollers. The spacing rollers 18 roll upon the outer edge of the flange 12 on the inner bearing ring. The flange 12 has a straight-sided circumferential groove 20 forming a track around it into which the flanges 19 fit, thereby retaining the spacing rollers in axial position.

Surrounding the grooved bearing rollers and flanged spacing rollers is a retaining ring 21 which has an internal groove or channel 22 of the same width and depth as the groove 20. The retaining ring fits within the grooves of the bearing rollers and the flanges 19 of the spacing rollers fit into the channel 22, whereby both the bearing rollers and spacing rollers are retained in assembled position on the inner bearing ring.

The retaining ring is cut in two at one point on its circumference, and the two ends are halved together and provided with projections 23 and notches 24 which may be sprung into and out of engagement. After assembling the inner bearing ring, bearing rollers and spacing rollers within the retaining ring so that it fits in the grooves in the bearing rollers and over the flanges of the spacing rollers, the ends of the retaining ring are sprung together and thereby fastened. To remove a spacing roller or bearing roller it is only necessary to rotate the retaining ring until its split portion is over the roller, spring loose the ends of the retaining ring, and spread them apart sufficiently to slip the roller between them.

The outer bearing ring 25 surrounds the cylindrical bearing rollers 12, and is provided with an internal flange 26 at one end. This flange is beveled on its inner side to form a conical bearing surface 27 against which the conical end bearing surfaces 15 of the bearing rollers bear. When all the parts of the bearing are in assembled position, the retaining ring is confined within the grooves in the bearing rollers, and between the bearing and the spacing rollers and the outer bearing ring; and the space between the retaining ring and the outer bearing ring is insufficient to permit the ends of the retaining ring to be sprung loose from each other. Consequently, so long as the outer bearing ring is in place the other parts of the bearing cannot be removed, and the bearing cannot come apart.

It is evident from the foregoing description that modifications of the shape and changes in the arrangement of the parts may be made, and the invention is not limited to the exact shapes and arrangements shown in the drawings.

I claim the following as my invention:

1. In a roller bearing, grooved bearing rollers, cylindrical spacing rollers having peripheral flanges midway of their length arranged between said bearing rollers with said flanges in the grooves of the bearing rollers, an inner bearing ring having an outer circumferential flange provided with a groove around its periphery adapted to receive the flanges of said spacing rollers, and a retaining ring surrounding and bearing against said spacing rollers to retain them in said groove.

2. In a roller bearing, grooved bearing rollers, spacing rollers having peripheral flanges arranged between said bearing rollers with said flanges in the grooves of the bearing rollers, said spacing rollers being in contact with said bearing rollers outside of said grooves on both sides thereof, an inner bearing ring having a circumferential flange arranged in the grooves of the bearing rollers, said circumferential flange having a groove into which the flanges of said spacing rollers project.

3. In a roller bearing, grooved bearing rollers, spacing rollers having peripheral flanges arranged between said bearing rollers with said flanges in the grooves of the bearing rollers, said spacing rollers being in contact with said bearing rollers outside of said grooves on both sides thereof, an inner bearing ring having a circumferential flange arranged in the grooves of the bearing rollers, said circumferential flange having a groove into which the flanges of said spacing rollers project, and a retaining ring surrounding said bearing rollers and spacing rollers and lying in the grooves of said bearing rollers.

4. In a roller bearing, grooved bearing rollers, spacing rollers having peripheral flanges arranged between said bearing rollers with said flanges in the grooves of the bearing rollers, an inner bearing ring having a circumferential flange arranged in the grooves of the bearing rollers, said circumferential flange having a groove into which the flanges of said spacing rollers project, and a retaining ring surrounding said bearing rollers and spacing rollers and lying in the grooves of said bearing rollers, said retaining ring having an internal groove into which the flanges of said spacing rollers project.

5. In a roller bearing, grooved bearing rollers, an inner bearing ring having a circumferential flange arranged in the grooves of the bearing rollers, a split retaining ring of spring metal surrounding said bearing rollers and arranged in the grooves thereof, the ends of said retaining ring having radial notches and pins coöperating with each other for securing them together, and means for preventing the springing apart of said ends.

6. In a roller bearing, grooved bearing rollers, an inner bearing ring having a circumferential flange arranged in the grooves of the bearing rollers, a split retaining ring of spring metal surrounding said bearing rollers and arranged in the grooves thereof, the ends of said retaining ring having radial notches and pins coöperating with each other for securing them together, and an outer bearing ring, said outer bearing ring closely encircling said retaining ring whereby it prevents the springing apart of said ends.

7. A combined radial and thrust antifriction bearing comprising an outer bearing ring having an annular bearing surface within it and an internal flange near one end thereof, an inner bearing ring having an external flange and annular bearing surfaces adjacent thereto, two series of circularly spaced rollers between said bearing rings, the rollers of one series alternating with the rollers of the other series, the rollers of one series being grooved to straddle the flange on said inner bearing ring, and the rollers of the other series having flanges lying in the grooves of the rollers of the first series, and the ends of said grooved rollers bearing against the internal flange of the outer bearing ring.

8. A combined radial and thrust antifriction bearing comprising an outer bearing ring having an annular bearing surface within it and an internal beveled flange near one end thereof, an inner bearing ring having an external beveled flange and annular bearing surfaces adjacent thereto, the beveled faces of said flanges facing each other, two series of circularly spaced rollers between said bearing rings, the rollers of one series alternating with the rollers of the other series, the rollers of one series being grooved to straddle the flange on said inner bearing ring, the bearing portion at one side of the groove of each grooved roller having beveled ends, the rollers of the other series having flanges lying in the grooves of the rollers of the first series, and the beveled ends of said grooved rollers bearing against the beveled internal flange of the outer bearing ring.

Signed at St. Louis, Missouri, this 21st day of March, 1914.

ONESIME E. MICHAUD.

Witnesses:
 AMASA M. HOLCOMBE,
 MARTHA A. SHELTON.

Copies of this patent may be obtained for five cents each, by addressing the "Commissioner of Patents, Washington, D. C."